United States Patent [19]

Airhart

[11] 4,100,991
[45] Jul. 18, 1978

[54] FAST CYCLE SEISMIC GAS EXPLODER AND METHOD

[75] Inventor: Tom P. Airhart, Plano, Tex.

[73] Assignee: Atlantic Richfield Company, Los Angeles, Calif.

[21] Appl. No.: 740,704

[22] Filed: Nov. 11, 1976

[51] Int. Cl.² .............................................. G01V 1/10
[52] U.S. Cl. .................................... 181/117; 181/114; 181/118; 340/15.5 SW
[58] Field of Search ................... 181/117, 118, 114; 340/15.5 SW

[56] References Cited

U.S. PATENT DOCUMENTS

| 3,198,282 | 8/1965 | Dunaway | 181/117 |
| 3,958,661 | 5/1976 | Dransfield et al. | 181/117 |
| 3,981,379 | 9/1976 | Sayous | 181/117 |

Primary Examiner—Howard A. Birmiel
Attorney, Agent, or Firm—Robert M. Betz

[57] ABSTRACT

Within a stationary upstanding cylindrical housing, a piston and a base member resting on the ground are separated by an expansible detonation chamber. Means are provided for feeding successive charges of a combustible gas mixture into the chamber at a rapid rate and initiating a corresponding series of gas explosions therein. Recoil of the piston following each explosion compresses a first air spring which then forcibly thrusts the piston downwardly. Piston recovery for the next cyclic operation is thereafter slowed by means of a second air spring-dashpot combination.

12 Claims, 1 Drawing Figure

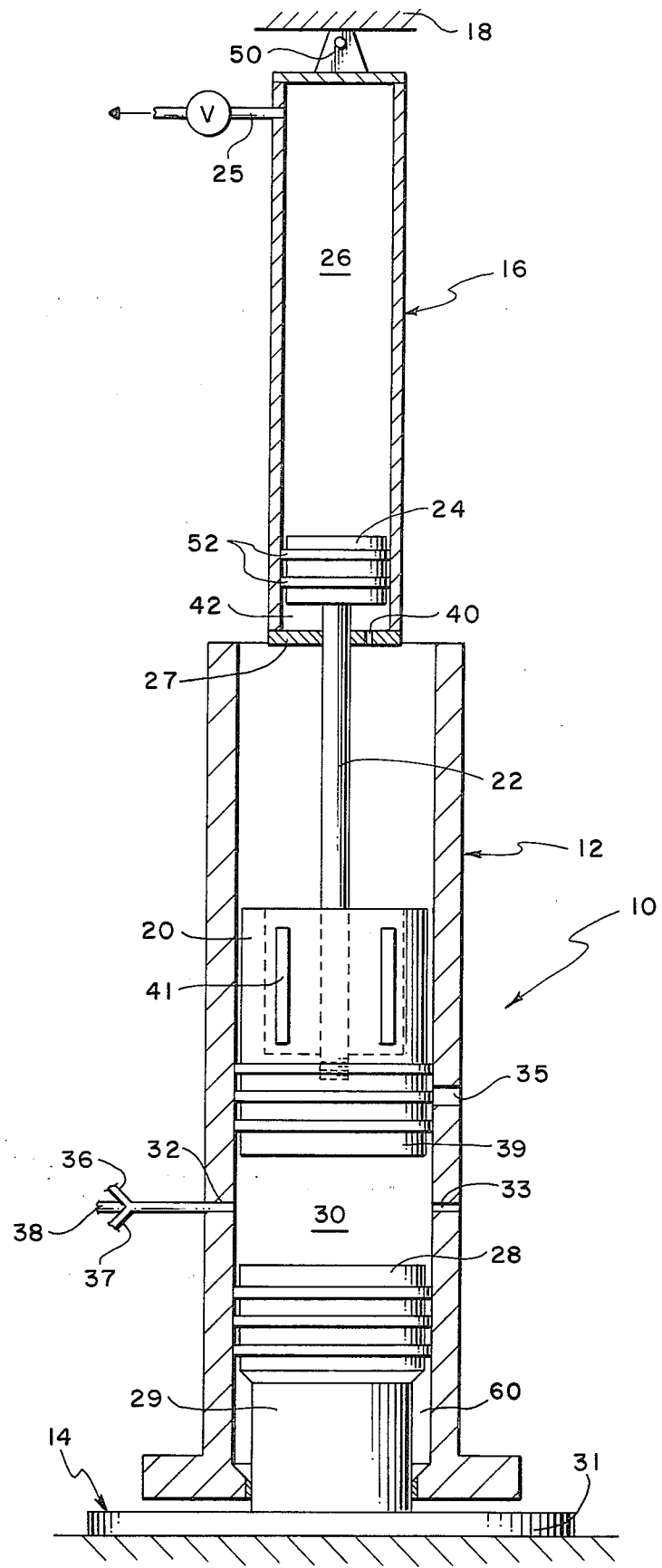

FAST CYCLE SEISMIC GAS EXPLODER AND METHOD

BACKGROUND OF THE INVENTION

1. Field of the Invention

This invention relates to seismic prospecting and to the generation of seismic waves by gas exploders. More particularly, this invention relates to an apparatus and method for imparting successive seismic impulses at the earth's surface at a high repetition rate utilizing a gas exploder.

2. Description of the Prior Art

Rapidly cycled gas exploder seismic sources may be used to generate coded sequences of seismic impulses which are highly important in the development of computerized data acquisition systems. One limiting feature in any such cyclic operation is the speed with which the recoil and recovery of the movable piston of the exploder may be accomplished. This invention is primarily directed toward this problem.

As described in co-pending commonly assigned application Ser. No. 526,842 entitled A HIGH SPEED SEISMIC GAS EXPLODER AND METHOD OF OPERATION filed Nov. 25, 1974, in the name of Daniel P. Hearn, now U.S. Pat. No. 3,995,713 a seismic gas exploder for injecting seismic signals into the earth is provided with a high speed hydraulic catching apparatus. With the aid of this apparatus, the exploder rebounds essentially unrestrained after being fired at the surface of the earth and thereafter falls freely from its maximum rebound height to within a few inches of the ground. The exploder is then lowered slowly to its starting position under hydraulic damping. According to one alternate feature of this prior art invention, the upward travel of a piston connected to the gas exploder is adapted to pressurize an enclosed volume of air which is then available to aid gravity in accelerating the downward movement of the exploder until a predetermined intermediate position is reached.

The present invention makes use of a compressed air energy source such as described above in a novel recoil and recovery system for the movable piston of a seismic gas exploder. It is an essential feature of the system to be described, however, that the exploder housing does not itself leave the earth, as in the above-referenced application. This is accomplished by taking advantage of the so-called "free base" construction more particularly described in co-pending Airhart patent application Ser. No. 650,370, filed Jan. 19, 1976, now U.S. Pat. No. 4,007,803, and by eliminating any spring biasing means directly interconnecting the housing and the movable piston.

SUMMARY OF THE INVENTION

It is a general object of this invention to provide a seismic gas exploder capable of operation at a high repetition rate.

It is a further object of this invention to provide a seismic gas exploder which operates at a high repetition rate without the danger of spurious secondary signals.

It is yet another object of this invention to provide a seismic gas exploder which is adapted to provide signals in a rapid coded sequence.

In accordance with a preferred embodiment of this invention, there is provided a lower upstanding cylindrical housing with an open top and a bottom enclosed by a separate base member movable independently against the earth. A relatively lightweight generator piston is movable within the housing above the base to define an expansible detonation chamber. An upper enclosed air-filled cylinder is independently supported above the cylindrical generator housing and in axial alignment therewith. A control piston movable within the upper cylinder is rigidly interconnected with the generator piston by means of a piston rod.

Upon ignition of a combustible gas mixture introduced within the combustion chamber, a seismic pulse is delivered to the earth through the base and the two pistons are driven upwardly. In consequence, the air above the control piston is compressed to form a first air spring which then aids gravity in accelerating the two pistons downwardly. As the control piston approaches the bottom of the upper cylinder, the air beneath it is compressed to form a second air spring which cushions the final portion of piston recovery. An orifice at the bottom of the upper cylinder vented to atmosphere dissipates the energy being stored in the second air spring by dashpot action, thereby eliminating any tendency of the control piston to bounce. The ignition-recoil-return cycle is then repeated at a rate determined by the ignition system, limited of course by the maximum cycling speed obtainable.

The invention also comprehends a method of injecting a series of seismic pulses into the earth at a high repetition rate with a seismic gas exploder having a closed expansible detonation chamber formed within an upstanding cylindrical housing between a rigid top and a rigid bottom comprising the steps of placing the rigid bottom into direct earth contact, initiating a gas explosion within the detonation chamber, utilizing the upward motion of the rigid top to store energy in a first spring device, utilizing the energy of said first spring device to thereafter accelerate the rigid top downwardly, opposing such downward movement by the compression of a second spring device so as to slow and stop the downward movement at a desired location and thereafter repeating the cycle steps at a high repetition rate.

BRIEF DESCRIPTION OF THE DRAWINGS

The drawing shows a vertical section through a seismic gas exploder in accordance with the invention.

DESCRIPTION OF THE PREFERRED EMBODIMENTS

With reference now to the drawing, there is shown a seismic gas exploder 10 consisting of an upstanding cylindrical housing 12 assembled with a free base 14 (i.e., one that is movable vertically like a piston independent of the housing 12) in contact with the earth and an upper pneumatic recoil and recovery cylinder 16 suspended beneath a fixed overhead support 18, such as a truck body or a free standing framework.

Within the cylindrical housing 12, a movable generator piston 20 is carried on a piston rod 22. A control piston 24 is movable within the upper cylinder 16 and is rigidly attached to the upper end of the piston rod 22. A valved inlet 25 in the upper cylinder 16 is connected to a suitable source (not shown) of compressed air through which the spaced 26 above the control piston 24 may be initially filled with air or other gas at any desired pressure, space example 20 to 30 psi. In its rest position control piston 24 will seat on the lower end 27 of the cylinder 16, which is provided with an orifice 40.

The base 14 consists generally of a base piston 28, a connecting shank 29 and a bottom impact plate 31. The space between the generator piston 20 and the base piston 28 forms an expansible detonation chamber 30 which is provided with a fuel gas inlet 32 and a vent 33 penetrating the wall of the cylindrical housing 12. A larger exhaust port 35 penetrates the wall of the housing above the vent 33 and is exposed to the detonation chamber 30 only when the control piston 20 is driven sufficiently above its initial rest position. The generator piston 20 and the base piston 28 are provided with metal rings for greater durability. Seals 52 for the control piston 24 may be either metal or elastomeric.

The moving elements of the exploder, including the pistons 20 and 24, the rod 22 and the base 14, are preferably constructed of lightweight aluminum or steel so that the cyclic operation to be described requires as little energy as possible. In keeping with this objective, the upper portion of the piston 20 may be hollowed out so as to leave only a peripheral shell against which longitudinal bearing strips 41 are affixed. The base 39 of the piston 20 may be suitably tapped and threaded to receive the lower end of the rod 22. The free base 14 is preferably a stiff, low inertia element to provide maximum acceleration of the underlying earth layers. This generates seismic impulses of relatively high frequency which are advantageous in shallow, seismic work where high resolution is particularly important.

In operation, a fuel gas and oxygen may be provided through separate conduits 36 and 37, then mixed and introduced through inlet 32 into the detonation chamber 30. Ignition of the mixture is accomplished through a suitable spark plug identified generally by reference 38. The base 14 transmits a compressional seismic impulse downward to the earth while the pistons 20 and 24 are simultaneously driven upwardly. Thereupon the air in space 26 is rapidly compressed. Air is allowed to enter the cylinder 16 beneath the rising piston 24 through the orifice 40. Thus, no substantial vacuum forms to damp the upward piston movement. The compressed air in space 26 acts as a first air spring so that when the increasing spring force and the pull of gravity balance the diminishing force of recoil, the pistons 20 and 24 are stopped in their upward travel and thrust forceably downward. As the control piston 24 approaches the lower end 27 of the cylinder 16, the air in the diminishing space 42 is compressed to form a second air spring which cushions the final portion of the fall of the piston 24. However, a dashpot action is insured by the presence of the orifice 40 so that the piston 24 does not bounce as it returns to a rest position on or in close proximity to the lower end 27.

As piston 20 returns downwardly, a substantial portion of the spent gases within the chamber 30 are scavenged through the exhaust port 35. With the introduction of a succeeding charge of combustible fuel through the inlet 32, the bulk of the remaining spent gases in the chamber 30 are ejected through the vent 33 and the entire process is repeated.

It will be understood that any means well known in the art for repetitively injecting successive charges of a combustible gas mixture into the detonation chamber 30 in timed relation to the return of the piston 20 may be employed. Preferably, however, this is accomplished by interconnecting inlet 32 with a novel multiple mixer assembly which forms the subject of a separate invention described in copending commonly assigned application Ser. No. 751,406, entitled CHARGING AND IGNITION SYSTEM FOR GAS EXPLODERS and filed Dec. 16, 1976 in the name of Tom Patterson Airhart, now U.S. Pat. No. 4,073,362.

Since the cylindrical housing 12 is independent of the base piston 28, it experiences no upward thrust and remains completely stationary throughout a succession of explosions. This eliminates any rebound of the housing 12 which would otherwise produce undesirable secondary impulses at the impact plate 30.

As the combination of pistons 20 and 24 and the piston rod 22 travels upwardly, any deviant motion transmitting a bending moment to the cylinder 16 may be compensated by means of the universal support 50 about which the cylinder 16 may pivot. If desired, the exploder 10 may be supported so that the direction of its downward thrust is at an angle such as 45 degrees to the horizontal. In this manner it may be useful in a production of shear waves as well as compressional waves.

The metal seals 52 of the control piston 24 may be designed to be sufficiently leaky so as to dispense with the requirement for the orifice 40. In that event there will be a combined spring-dashpot action in both the recoil and recovery motions of the piston 24.

As the initial pressure of the air in space 26 is increased, its effective spring action is stiffened. That is to say, for a given force of gas explosion within the chamber 30 the pistons 20 and 24 will recoil to a lesser height and will be thrust downwardly with greater acceleration so that the complete cycle time is reduced. By increasing the initial downwardly biasing force exerted against the piston 20, it is also possible to deliver a narrower compressive pulse of greater amplitude. This results from the fact that the piston 20 moves a lesser distance and the base piston 28 moves farther and faster for a given explosive energy input.

Another mechanism for varying the performance of the exploder 10 is available through variance in the size of the orifice 40. As it is increased, the piston 24 will experience less resistance due to partial vacuum beneath it. Conversely, there will be less dashpot action upon the return of control piston 24 to its rest position. If the orifice 40 is enlarged until the lower end 27 no longer impedes air flow, the injection of the next succeeding charge of gas within the chamber 30 may be timed to arrive during the recovery of the piston 20. In that event the gas injection and the concurrent scavenging of spent gases generate a second spring-dashpot action adapted to slow and stop the piston 20.

The use of this invention is not limited specifically to generation of cyclic seismic pulses at the earth's surface. For instance without variation in the essential mechanical function of its elements, the exploder 10 may be submerged in water and fired in a horizontal or upright position. In that event low pressure air may be introduced within the annular space 60 under the base piston 28 and surrounding the shank 29 so as to bias the base 14 away from the lower end of the housing 12. Water may be allowed to enter the open top of the cylinder or evacuated for less interference with piston travel. Ignition of the device may then serve to accelerate the base 14 through the water to create compressional or cavitation pulses in a manner well-known to the art.

Although the invention has been described and illustrated with a certain degree of particularity, it is understood that the present disclosure is made by way of example only and that numerous changes in the details of construction and the combination and arrangement of parts may be resorted to without departing from the spirit and scope of the invention as hereinafter claimed.

I claim:

1. A method of injecting a compressional pulse into the earth utilizing a seismic gas exploder with a closed expansible detonation chamber formed within an upstanding cylindrical housing between a rigid top and a rigid bottom comprising:
    (a) placing said rigid bottom into direct contact with the earth,
    (b) injecting a charge of combustible gas mixture into said detonation chamber,
    (c) igniting said mixture to initiate a gas explosion adapted to apply a compressional pulse to the earth through said rigid bottom and to drive said rigid top upwardly,
    (d) utilizing the upward motion of said rigid top to compress an air spring external to said housing, and
    (e) applying the energy of said compressed air spring thereafter to aid gravity acceleration of said rigid top in a downward direction.

2. A method as in claim 1 including the steps of causing said air spring to apply a downwardly biasing force against said rigid top and providing means for varying the effective biasing force of said air spring whereby the width and amplitude of said compressional pulse may be correspondingly varied.

3. A method of injecting a series of compressional pulses into the earth at a high repetition rate utilizing a seismic gas exploder with a closed expansible detonation chamber formed within an upstanding cylindrical housing between a rigid top and a rigid bottom comprising:
    (a) placing said rigid bottom into direct contact with the ground, so that said rigid bottom is movable downwardly relative to said housing,
    (b) injecting a charge of combustible gas mixture into said combustion chamber,
    (c) igniting said mixture to initiate a gas explosion adapted to apply a compressional pulse to the earth through said rigid bottom and to drive said rigid top upwardly,
    (d) utilizing the upward motion of said rigid top to store energy in a first spring,
    (e) applying the energy of said first spring to thereafter accelerate said rigid top in a downward direction,
    (f) opposing said downward movement of said rigid top by storing energy in a second spring responsive to said movement adapted to slow and stop the said movement at a desired location, and
    (g) repeating steps (b) through (f) at said repetition rate.

4. In a rapid-fire, rapid-cycle gas exploder including an upstanding cylindrical housing having an open top and an enclosed base resting on the earth, a piston movable vertically within said housing and adapted in combination with said housing sidewalls and said base to form an expansible detonation chamber, means for initiating a gas explosion within said chamber to apply a compressional pulse to said base, and means for reactivating said initiating means at a high repetition rate after each cycle of recoil and recovery of said piston, the improvement comprising means external to said housing and responsive to said recoil for pressurizing a first quantity of gas so as to apply a spring force adapted to accelerate a substantial portion of the downward travel of said piston, and means responsive to said downward travel for pressurizing a second quantity of gas so as to apply a second opposing spring force adapted to cushion the remainder of said downward travel and stop said piston at a desired location.

5. Apparatus as in claim 4 including dashpot means responsive to said downward movement for limiting the development of said second spring force.

6. In a rapid fire seismic gas exploder including an upstanding cylindrical housing having an enclosed base, a generator piston movable within said housing and adapted, in combination with the housing sidewalls and with said base to form an expansible detonation chamber, and means for initiating a succession of gas explosions within said detonation chamber to drive said base and said generator piston in opposite directions at a high repetition rate, the improvement comprising:
    (a) an upstanding, enclosed, gas-filled cylinder supported above said housing in axial alignment therewith,
    (b) a control piston movable within said cylinder and rigidly interconnected with said generator piston, and
    (c) means for venting said cylinder below said control piston, whereby the gas in said cylinder above and below said control piston forms respectively a first and a second air spring compressed in order by the recoil and recovery of said pistons, said venting means being effective to dissipate the energy in said second air spring.

7. Apparatus as in claim 6 wherein said venting means is an orifice in the bottom of said cylinder.

8. Apparatus as in claim 7 wherein said orifice is of variable size.

9. Apparatus as in claim 6 wherein said cylinder is supported by means enabling pivot thereof about a horizontal axis.

10. In a rapid fire seismic gas exploder including an upstanding cylindrical housing having an enclosed base, a generator piston movable within said housing and adapted, in combination with the housing sidewalls and with said base to form an expansible detonation chamber, and means for initiating a succession of gas explosions within said detonation chamber to drive said base and said generator piston in opposite directions at a high repetition rate, the improvement comprising:
    (a) an upstanding, enclosed, gas-filled cylinder supported above said housing in axial alignment therewith and
    (b) a control piston movable within said cylinder and rigidly interconnected with said generator piston, a controlled clearance being provided between said control piston and the inner wall of said cylinder, whereby the gas in said cylinder above and below said control piston forms respectively a first and a second air spring compressed in order by the recoil and recovery of said pistons, and whereby said controlled clearance dissipates the energy stored in both said springs.

11. A method of generating an acoustic pulse in water utilizing a seismic gas exploder with a closed expansible detonation chamber formed within a submerged cylindrical housing between a generator piston and a base piston movable in said housing, said base piston being rigidly interconnected with an external impact plate through one end of said housing comprising the steps of:
    (a) biasing said base piston so that said impact plate is urged toward said one end of said housing;

(b) injecting a charge of combustible gas mixtures in said combustion chamber;

(c) igniting said mixture to initiate a gas explosion adapted to drive said impact plate through the water to thereby apply an acoustic pulse thereto and to cause said generator piston to recoil toward the other end of said housing;

(d) utilizing said recoil to store energy in a first spring, applying the energy of said first spring to thereafter return said generator piston toward said one end; and (e) opposing said return of said generator piston by storing energy in a second spring reponsive to said return adapted to slow and stop said generator piston at a desired location.

12. A method of injecting a shear wave pulse into the earth utilizing a seismic gas exploder with a closed expansible detonation chamber formed within an elongated cylindrical housing between a rigid top and a rigid bottom comprising the steps of:

(a) supporting said housing so that its longitudinal axis extends at an angle of approximately 45° to the horizontal, (b) injecting a charge of combustible gas mixture into said detonation chamber, (c) igniting said mixture to initiate a gas explosion adapted to inject said shear wave pulse into the earth through said rigid bottom at said angle and to drive said rigid top upwardly, (d) utilizing the upward motion of said rigid top to compress an air spring external to said housing, and (e) applying the energy of said compressed air spring thereafter to aid gravity acceleration of said rigid top in a downward direction.

* * * * *